UNITED STATES PATENT OFFICE.

FRANCIS X. GOVERS, OF OWEGO, NEW YORK, ASSIGNOR TO AMERICUS MANUFACTURING COMPANY, OF NEW YORK, N. Y., A CORPORATION OF NEW YORK.

FABRIC-COATING.

No. 800,145.      Specification of Letters Patent.      Patented Sept. 26, 1905.

Application filed November 12, 1904. Serial No. 232,515.

*To all whom it may concern:*

Be it known that I, FRANCIS X. GOVERS, a citizen of the United States, residing at Owego, in the county of Tioga and State of New York, have invented new and useful Improvements in Fabric-Coatings, of which the following is a specification.

This invention relates to fabric-coatings, particularly casein coatings, and has for its object to provide an improved porous coating for paper, cloth, and the like which will be free from the disadvantages of coatings which have been heretofore used and which will flow well under the coating-brushes, producing a surface free from brush-marks and of a perfectly uniform appearance.

Another object of my invention is to produce a coating which can be kept for a practically indefinite time and which is free from the offensive odor which renders it almost impossible to use some casein coatings.

Another object of my invention in one of its principal embodiments is the utilization of sulfuric-acid casein in a fabric-coating in such a manner and with such other chemical agents as to produce results which were universally regarded as impossible of accomplishment by those skilled in this art prior to my experiments and discoveries in connection with this form of casein.

A still further object of my invention is the provision, in a paper-coating, of a deliquescent ingredient or ingredient which has a tendency by the absorption of a certain amount of water to render the paper coated thereon very soft and pliable, qualities which are particularly valuable in coating box-boards, as such a coating can bend a sharp angle without breaking or showing any cracks or breaks upon its surface.

With these and other objects in view my invention in its preferred embodiment consists of a coating containing casein, preferably sulfuric-acid casein or casein precipitated by sulfuric acid, an alkaline phosphate, preferably trisodium phosphate, and an alkaline hyposulfite, preferably sodium hyposulfite, with a base or filler of kaolin or china-clay and water, with or without the addition of blancfixe or satin white and wax, preferably wholly or partially saponified carnauba-wax.

In the practice of my invention in its preferred form I dissolve about fifty parts, by weight, of sulfuric-acid casein in a solution containing about ten parts, by weight, of sodium phosphate and five parts, by weight, of sodium hyposulfite in one hundred to three hundred parts, by weight, of water. To this I add from two hundred to four hundred parts, by weight, of the base or filler, preferably china-clay. To this I sometimes add ten to fifty per cent., by weight, of satin white or an equivalent material and about five per cent. of a partially-saponified vegetable wax. The casein, sodium phosphate, and sodium hyposulfite act as a binder for the paste formed by the base or filler and water.

The casein, even when I employ sulfuric-acid casein, dissolved in the solution of sodium phosphate and sodium hyposulfite, is not precipitated from such solution by blancfixe, satin white, or equivalent material.

The casein solution above described has a slight acid reaction and for this reason does not attack the coating-brushes, as strongly-alkaline casein solutions are known to do. It flows readily and smoothly under the coating-brushes, flowing together well after coating and leaving a surface wholly free from brush-marks. The alkaline hyposulfite which I employ, being deliquescent, absorbs a certain amount of moisture, which renders the paper or the like coated with my improved composition soft and capable of being bent at sharp angles in box manufacture without exhibiting any sign of breaking.

The alkaline hyposulfite by reason of its preservative action on organic matter prevents the decomposition of the casein, thus avoiding the highly-offensive odor and partial precipitation and foam incident to the decomposition of casein, which are known to give a spotted or mottled appearance to the coating.

While the alkaline hyposulfite which I prefer to employ is that also known as "thiosulfate," the true hyposulfite may also be used.

An important and valuable feature of my invention is that my improved coating has no effect whatever upon lithographic stones, so that papers coated with the composition herein described are perfectly adapted to be printed by the lithographic process.

My improved composition is used in the manner well-known in this art and produces a coating having the qualities and advantages hereinbefore mentioned.

My composition can be utilized in other relations than as a fabric-coating, and any use to which such composition is found applicable is contemplated as being within the protection for which this application is made.

It is to be understood that this invention is not limited to the exact proportions specified, nor to the employment of all of the ingredients together, nor to the use only of the ingredients mentioned, inasmuch as the employment of equivalents of the ingredients hereinbefore specifically referred to are within the scope of this invention as defined in the appended claims.

Having thus described my invention, what I claim as novel, and desire to secure by Letters Patent, is—

1. A coating for paper and the like containing sulfuric-acid casein, sodium hyposulfite and a base or filler.

2. A coating for paper and the like containing casein, an alkaline phosphate, an alkaline hyposulfite and a base or filler.

3. A coating for paper and the like containing casein, sodium phosphate, sodium hyposulfite and a base or filler.

4. A coating for paper and the like containing sulfuric-acid casein, sodium phosphate, sodium hyposulfite, a base or filler and water.

5. A coating for paper and the like containing casein, an alkaline phosphate, an alkaline hyposulfite, a base or filler and wax.

6. A coating for paper and the like containing casein, an alkaline phosphate, an alkaline hyposulfite, china-clay, satin white and wax.

7. A coating for paper and the like having an acid reaction and containing sulfuric-acid casein dissolved in a solvent from which it is not precipitated by the addition of an alkaline or an alkaline-earth sulfate.

8. The herein-described coating for paper and the like containing sulfuric-acid casein, sodium phosphate, sodium hyposulfite, china-clay, satin white, wax and water in the proportions substantially as described.

In testimony whereof I affix my signature in presence of two subscribing witnesses.

FRANCIS X. GOVERS.

Witnesses:
 KATHRYN LA MONTE,
 ALFRED PFISTER.